April 17, 1934.                J. WEINBERGER                1,955,479
                             SOUNDPROOF VENTILATOR
                              Filed April 24, 1931
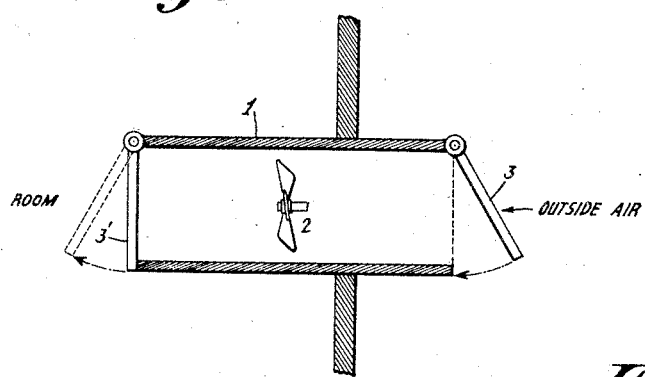
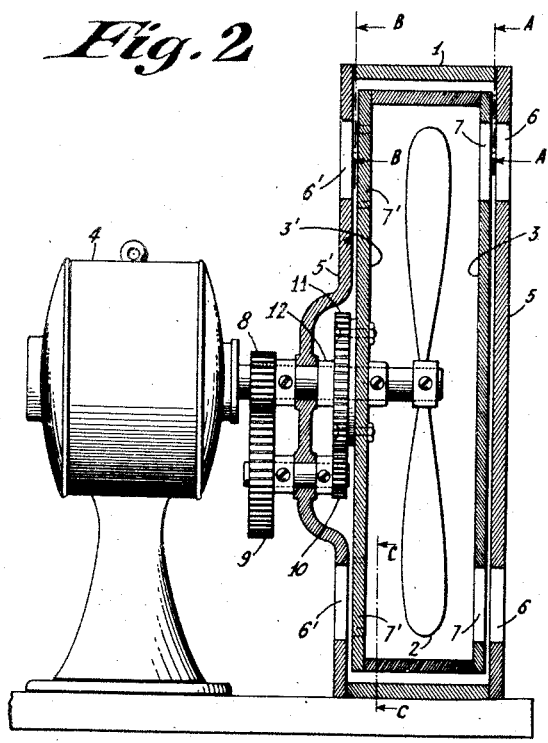
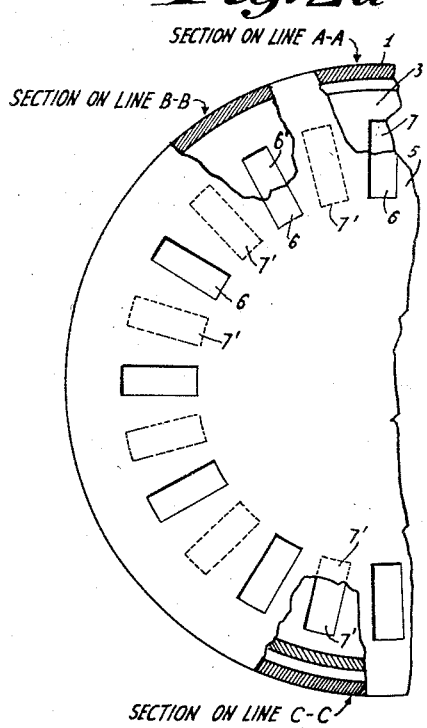
INVENTOR
Julius Weinberger Patented Apr. 17, 1934

1,955,479

UNITED STATES PATENT OFFICE 1,955,479

SOUNDPROOF VENTILATOR

Julius Weinberger, New York, N. Y.

Application April 24, 1931, Serial No. 532,503

9 Claims. (Cl. 98—1)

The object of this invention is to provide a device for use in ventilation, as for example for insertion below windows, which will transmit air for ventilating purposes, but prevent the transmission of annoying sounds or noises, such as may be present in a city street. A further object of the invention is to provide a device suitable for use in ventilating conduits, to prevent the transmission of undesired sounds through the conduit, while at the same time transmitting air for ventilating purposes. A further object of the invention is to provide a sound absorbent device which transmits a stream of air discontinuously or intermittently in contradistinction to the practice heretofore prevalent in the ventilating art of transmitting air for ventilating purposes in a continuous stream. A still further object of the invention is to provide a device in which the passage of sound is stopped absolutely, while discontinuous or intermittent ventilation occurs, in contradistinction to sound absorbent ventilating devices heretofore known in the art in which air is transmitted continuously and sound absorption is caused to take place by means of baffles or other absorbent devices placed in the air stream. Further objects of the invention will be apparent on inspection of the following specification taken in connection with the drawing wherein Figure 1 illustrates the general principle of my invention, while Figure 2 illustrates one method of constructing a sound absorbent ventilating device in accordance with this principle. Figure 2a is a side view of Figure 2, with certain portions of Figure 2 shown in section on Figure 2a as indicated by suitable section lines on Figure 2.

Referring now to the figures, the reference numerals are intended to denote the following constructional elements:

In Figure 1, 1 is a box, enclosure, duct or part of a ventilating conduit. 2 is a fan placed within this duct or box, or some similar device for causing air to pass into or out of the duct or box. 3 and 3' are doors or valves or shutters spaced apart along the duct or placed at each end of the box. The solid lines indicate the position of these shutters or valves when air is to be admitted to the box, while the dotted lines indicate the position of these shutters or valves when air is to be transmitted out of the box into a room.

In Figures 2 and 2a (Figure 2a being a side view of Figure 2) 1 is a drum shaped enclosure, duct or casing corresponding to the box of Figure 1, 2 is a fan within this enclosure which is driven by motor 4. 3 and 3' are circular discs forming the end plates of a rotatable drum placed within the first drum, 1. Disk 3' is fastened to a gear, 11 which in turn is fastened to a collar or sleeve, 12, concentric with the motor shaft which operates fan, 2.

The drum shaped casing, 1, has fastened to it a pair of end plates, 5 and 5'. These are perforated with a plurality of openings, 6, and 6'. Similar perforations, 7 and 7' are made in the plates of the interior drum (3 and 3'). These perforations are so made that the pairs of perforations, 6 and 7, are in line while the pairs of perforations 6' and 7' are staggered.

The interior drum is revolved at a low rate of speed by means of gears 8, 9, 10 and 11. Gear 8 is on the driving motor shaft, which drives the fan, gears 9 and 10 on a separate independent shaft, and gear 11 is fastened to end plate 3' of the interior drum.

In order to explain the principle of operation of my invention, refer now to Figure 1. In this figure it is intended that the fan, 2, shall be operated continuously within the box. Shutter or valve, 3, is opened by means of some suitable external mechanism, (not shown) valve 3' remaining shut. The suction of the fan causes air to enter the box from the outside. The external mechanism now shuts door, 3, and opens door, 3'. The air which has entered the box is then blown by the fan out into the room.

It is obvious under these conditions that noises or sounds cannot be transmitted from the outside air into the room since, when valve 3 opens, sounds enter the box along with the air, but cannot get into the room because valve 3' is shut. When valve 3 shuts, before valve 3' opens, the vibrations due to sound die off because it is no longer being supplied from the outside air. The air within the box is therefore free from sound, and when valve 3' opens it is blown out into the room without carrying any sound with it.

It will be clear that the principle of my invention lies in what I have termed discontinuous or intermittent ventilation. This consists essentially of causing air to enter a reservoir or duct through a valve, closing the entry valve, opening an exit valve and blowing the air out of the reservoir through the exit.

The cycle is repeated over and over again, the valves opening and shutting alternately. This repetition may be done very rapidly, though preferably at an inaudible rate (that is, less than 32 times per second or more than 15,000 times per second). With such rapidity of interruption of the air stream, there is no practical difference for ventilating purposes, between a continuous stream of air, and one which is turned on and off many times per second in accordance with my invention. However, the discontinuous method provides a perfect means of preventing the passage of noise along with the air.

Figures 2 and 2a show a practical method of carrying out the principle illustrated in Figure 1. In these figures the valves take the form of pairs of perforated plates, one set of which is fixed and the other set of which is rotating within the fixed plates. These plates are slotted so that air can pass when the slots on the moving plates come opposite similar slots on the fixed plates.

In referring to Figures 2 and 2a previously in the specification, the significance in the reference numerals was given. However, in order to describe these figures more clearly, some repetition will be desirable.

Referring to Figures 2 and 2a, a drum shaped housing or enclosure, 1, bears a pair of end plates, 5 and 5', each of which is slotted or perforated by means of slots or perforations 6 and 6'. The motor, 4, drives a fan, 2, within this housing. This fan operates at the rate of speed usual in ventilating fans. The same motor, through gears 8, 9, 10 and 11, causes an interior drum to revolve at a low rate of speed. These gears may be of suitable quiet gear material, such as textolite or bakelite. This interior drum is composed of a pair of end plates 3 and 3' held apart by means of spacers, and these plates have slots or perforations cut in them indicated by 7 and 7', similar to the slots 6 and 6'.

The slots in the front and rear plates of the moving element are staggered with respect to each other, as indicated in the side view of the device (Figure 2a). The staggering is so arranged that slots 6 and 7 are opposite each other when slots 7' are not opposite slots 6'. Then, when slots 7 have moved away from slots 6, and no further passageway exists across them, slots 7' come opposite 6'.

The interior drum is placed quite close to the external drum, 1, so that sound cannot leak across through air gaps.

It will be clear from this figure that with the fan operating continuously, when slots 7 are opposite slots 6, air enters the enclosure, but cannot pass through because slots 7' are not opposite 6'. Then, as the interior drum continues to revolve and slots 7 are away from slots 6, while slots 7' have come opposite slots 6', air leaves the enclosure through the passageway provided by the latter openings.

It will be clear to those skilled in the art that there are many different ways of carrying out the principles illustrated in Figure 1, of which one exemplification has been given in Figures 2 and 2a. Instead of using the drum shaped slotted valve arrangement of Figures 2 and 2a other types of valves may be employed. Instead of using an electric fan for causing air to pass into and out of the enclosure, a wind-driven fan may be used, or a pair of fans may be used, one in front of the enclosure and one in back of it, instead of a single fan in the inside. Also, various adjuncts may be added such as filters for removing dust from the air, heating or cooling devices, or regulating devices for adjusting the quantity of air to be passed through the ventilator. I therefore do not wish to be restricted in the scope of my invention to the particular arrangement shown in Figures 2 and 2a but desire to give my invention the broad scope indicated in the following claims.

I claim:

1. A sound proof ventilator comprising a stationary enclosure having perforated end plates, a rotatable drum consisting of a pair of perforated end plates held apart by spacers, said drum being housed within the first named enclosure, a fan within said drum, a motor driving said fan, and gearing operable by said motor to revolve the interior drum.

2. A sound proof ventilator comprising a stationary enclosure having end plates, perforations in said end plates, the perforations in one end plate being in line with those in the other end plate, a rotatable drum consisting of a pair of end plates held apart by spacers, perforations in said end plates, the perforations in one end plate being staggered with respect to those in the other end plate, said drum being located within the stationary enclosure, means for causing air to move into or out of said enclosure and drum, and means operable by said last mentioned means for causing the interior drum to rotate.

3. A sound proof ventilator comprising a stationary enclosure, valves adapted to transmit air into or out of said enclosure, a motor driven fan for causing air to move positively through said valves, and means adapted to open the intake valve while the exhaust valve is closed and vice versa, said means being periodically operated by the same motor which drives the fan.

4. A sound proof ventilator comprising a stationary enclosure having an intake and an exhaust valve, a motor driven fan, and means operated by the motor driving said fan whereby said valves are periodically opened and closed at an inaudible frequency, the intake valve being opened when the exhaust valve is closed and vice versa.

5. A sound proof ventilator comprising a stationary enclosure, an intake valve at one side of said enclosure, an exhaust valve at the other side of said enclosure, a fan within said enclosure, a motor driving said fan, and means operable by said motor for periodically opening the intake valve and closing the exhaust valve and vice versa.

6. A ventilating system for supplying air from a source of air to an enclosure comprising means providing an air passageway between said source of air and said enclosure, continuously driven rotary valves arranged adjacent the ends of said air passageway, and means cooperating with said rotary valves permitting one end of said air passageway to be open only while the other end of said air passageway is closed.

7. A ventilating system for supplying air from a source of air to an enclosure comprising means providing an air passageway between said source and said enclosure, continuously driven rotary valves arranged at the ends of said air passageway for preventing the flow of air into and out of said passageway at the same instant, means for driving said rotary valves, and a fan located within said passageway and connected with said driving means so as to be continuously driven with said rotary valves.

8. In ventilating apparatus, an air conduit supported in a fixed position during normal operation of said apparatus, means associated with said conduit and operating continuously to induce air-flow through said conduit in only one and the same direction, and means for first checking the rate of air inlet into one end of said conduit and permitting relatively free air exhaust from the other end thereof and then checking the rate of air exhaust and permitting relatively free air intake into said one end of said conduit, in alternate fashion, to cause said conduit to function as a sound trap for sound.

9. In ventilating apparatus of the character described, an air conduit supported in a fixed position during normal operation of said apparatus and being itself a relatively good transmitter of sound waves, means associated with said conduit and operating continuously to induce air-flow through said conduit in only one and the same direction, and means operating to alternately close the respective ends of said conduit to the propagation of sound waves.

JULIUS WEINBERGER.